United States Patent
Vijayendran et al.

(10) Patent No.: US 6,402,832 B1
(45) Date of Patent: Jun. 11, 2002

(54) WALLBOARD JOINT COMPOUND

(75) Inventors: Bhima R. Vijayendran, Dublin; Gregory R. White, Hilliard; Rachel M. Thurston, Columbus; Duryodhan Mangaraj, Dublin, all of OH (US)

(73) Assignee: Fleetwood Enterprise, Inc. a Delaware Corporation, Riverside, CA (US)

( * ) Notice: Subject to any disclaimer, the term of this patent is extended or adjusted under 35 U.S.C. 154(b) by 0 days.

(21) Appl. No.: 09/571,760

(22) Filed: May 15, 2000

(51) Int. Cl.⁷ .......................... C04B 11/00; C04B 26/00
(52) U.S. Cl. .................. 106/778; 106/779; 106/781; 524/4; 524/5; 524/6
(58) Field of Search ................ 106/778, 779, 106/781; 524/4, 5, 6

(56) References Cited

U.S. PATENT DOCUMENTS

| | | | | |
|---|---|---|---|---|
| 4,287,103 A | * | 9/1981 | Francis et al. ............... | 106/78 |
| 4,487,864 A | * | 12/1984 | Bermudez et al. ........... | 524/2 |
| 4,845,152 A | * | 7/1989 | Palmer ....................... | 524/734 |
| 5,039,341 A | * | 8/1991 | Meyer ........................ | 106/189 |
| 5,258,069 A | * | 11/1993 | Knechtel et al. ............. | 106/162 |
| 5,268,466 A | * | 12/1993 | Burdick ....................... | 106/171 |
| 5,425,806 A | * | 6/1995 | Doolan et al. ............... | 106/203 |
| 5,512,616 A | * | 4/1996 | Podlas .......................... | 524/18 |
| 5,536,871 A | * | 7/1996 | Santhanam ................... | 560/196 |

* cited by examiner

Primary Examiner—Elizabeth D. Wood
(74) Attorney, Agent, or Firm—Price and Gess

(57) ABSTRACT

The present invention is an improved wallboard joint compound comprising an inorganic joint compound such as, for example, gypsum, mixed with water, plus one or more additives selected to reduce the moisture in the gypsum compound and improve the strength of the finished wallboard joint. The first additive is selected from a class of water soluble functional polymer with either nitrogen or sulfonate, such as, for example, polyvinyl pyrrolidone (PVP). A second additive is selected from a class of solid epoxy resins, preferably added together with the first additive. These two additives, when mixed with the joint compound alone or in combination, produced a more flexible, higher strength wallboard with a reduce moisture content and quicker drying time.

24 Claims, No Drawings

WALLBOARD JOINT COMPOUND

BACKGROUND OF THE INVENTION

1. Field of the Invention

The invention relates generally to an improved compound for wallboard joints exhibiting quicker drying times and improved flexibility with enhanced strength and toughness.

2. Description of Related Art

Gypsum wallboards are formed by sandwiching a core of wet plaster between two sheets of heavy paper. When the core sets and is dried, the sandwich becomes a rigid, substantially fire-resistant unit of building material. The boards are fire-resistant because of the natural water content of the gypsum, which when exposed to heat or flame is released as steam, retarding heat transfer. Gypsum sheathing for use under exterior finishes are among the most common materials used in housing.

Interior walls are typically formed by mounting gypsum wallboards side-by-side to a frame with nails, thereby creating a joint between adjacent wallboards. To conceal the discontinuities formed by the joints, nails, and other imperfections, a joint compound is applied which subsequently dries to a hard finish. The joint compound can be sanded and smoothed such that, upon painting or papering the wall, the discontinuity is imperceptible.

Joint compounds can be broadly classified as "setting" type and "drying" or "non-setting" type. Both types are based on inorganic fillers such as clay, silica, gypsum etc. Setting types are mostly comprised of gypsum with accelerators to set the joint compound, as discussed in U.S. Pat. No. 5,653,797 issued to National Gypsum. Typical drying type joint compound compositions are based on calcium carbonate and calcium sulfate dihydrate, such as those disclosed in U.S. Pat. No. 5,336,318 issued to United States Gypsum Company.

To form a wall from the individual wallboard, first the wallboards are laid with their ends abutting. A tape is placed over the abutting ends and a joint compound is applied to the gap between the boards and allowed to dry. An embedding coating is then applied to the joint, and the embedding coating is allowed to dry. Optionally, a third coating is applied to the taped joint and more drying occurs. Finally, a finishing coat is applied to cover all the preceding coats and once again the process requires further drying. The whole process can take ten to twenty four hours of manufacturing and drying time to complete. During the periods of drying time, no work can be performed on the wallboards.

In joint compound chemistry the moisture content plays an important role in the strength of the finished material. Water is needed to hydrate the compound, but any excess water needs to be removed because excess water increases the drying time and increases the porosity of the joint compound, which reduces its strength. This is balanced against the need for sufficient water to make the compound workable before it sets. The optimum water content is an important factor affecting the strength as well as the appearance of the wallboard.

Houses using the wallboards to form interior walls either form the walls onsite or have the walls manufactured in a factory and transported to the site prefabricated. In most cases the entire house is constructed in the factory and shipped to the site. Manufacturing the wallboards at a factory significantly decreases the costs of the wallboards due to the economies of scale and the elimination of labor onsite to make the wallboards and wait for the wallboards to dry. Therefore, there is a significant advantage to manufacturing the wallboards in a factory and transporting the wallboards to the site for construction of the housing. However, during transportation of the house or the individual wallboards, vibration and stress due to packing, unpacking, and during the transport subject the wallboards to loads not experienced during normal use. There is a need for a wallboard which can be subjected to vibrational loads without cracking, and which remain flexible without losing their overall strength.

Reducing the drying time of the joint compound would permit timely application of subsequent layers of compound or paint to the wall board. Shorter drying times are of critical importance in a typical processing line used for manufacturing prefabricated walls. Also, prolonged periods of moisture on the wallboards can result in a shadowing effect, where some of the wallboard is discolored due to the water absorption. Rapid drying minimizes the shadowing effect which in turn can eliminate and/or accelerate subsequent additional painting applications.

Another difficulty with conventional joint compounds is that they have a tendency to splatter, leading to waste, additional clean-up, and expensive precautionary measures. This problem is exacerbated where the application is on horizontal ceiling surfaces. A joint compound with improved rheology and internal cohesive strength is needed to minimize spillage and splattering of compound on the floor beneath.

SUMMARY OF THE INVENTION

The present invention is an improved wallboard compound comprising gypsum plus one or more additives to reduce the moisture in the gypsum compound and improve the strength of the finished wallboard, and a wallboard made with the improved wallboard compound. The first class of additives are water soluble polymers containing either a nitrogen (amine or substituted amines) or sulfonate group. A second class of additives are solid epoxy resins, preferably added together with the above mentioned water soluble polymer. These additives, when mixed with standard joint compound, produces a more flexible, higher strength wallboard with a reduced moisture content and quicker drying time. Further, the rheology of the compound is enhanced such that the compound has good leveling and flow behavior during application, and sufficient cohesiveness to reduce spilling or dripping from horizontally applied surface.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a wallboard joint compound which has a faster drying time than conventional wallboard joint compound and further has increased strength over conventional wallboard joint compounds.

The present invention focuses on setting type joint compounds based on gypsum, even though the use of functional polymers and epoxy resin additive are applicable to drying type joint compound as well. In the setting of a typical joint compound, water plays a major role. It is essential for hydrating the gypsum to form a hard material state. However, excess water poses several problems. Excess water takes a long time to evaporate from the board. This slows down subsequent coating and painting operations. Capillary forces draw excess water into the gypsum board, creating darker regions on the wallboard. This shadowing can require additional painting steps to cover the discolored regions. Excess water also negatively influences rheology leading to poor flow and cohesive integrity of the joint compound.

Moisture control of a standard joint compound can be improved by the addition of a class of functional polymers having nitrogen or sulfonate groups. These functional polymers tie up water in a gypsum compound, leading to improved drying with stronger and tougher joints that resist cracking.

Examples of functional polymers containing nitrogen are polyvinyl pyrrolidone (PVP), copolymer of vinyl pyrrolidone, polyvinyl amine and its copolymers, and cationic polysacharrides like cationic guar, poly (2-ethyl oxazoline), polyethylene imine and their copolymers. Examples of vinyl pyrrolidone based polymers are K-15, K-29-32, K-60 and K-90 homopolymers, alkylated PVP polymers (Ganex P-904L), PVP amino acrylate (937 and 945), and PVP vinyl acetate copolymer (S-630) from International Specialty Polymers of New Jersey. The functional polymers have a preferred molecular weight in the range of 5000–1,000,000, and more preferably in the range of 10,000–500,000. in addition to the water soluble functional polymers with nitrogen, a second class of functional polymer is sulfonated water soluble polymers. Examples of sulfonated polymers are AQ resins from Eastman Chemicals, acryl amido propane sulfonate (AMPS) modified vinyl and acrylic polymers, poly styrene sulfonate, and polyvinyl sulfonate polymers.

Another additive effective in controlling the water content in a typical joint compound is an epoxy compound such as bisphenol A based diglycidyl ether compounds (Epon resins from Shell). Examples of epoxy compounds are Epon 1004, Epon 1002 F, Epon 1007 F and higher molecular weight epoxy resins. The epoxy group reacts with water under alkaline pH and the heat that is encountered in a typical gypsum formulation. This leads to an effective and rapid removal of water from the joint compound during the setting process. Further, some level of interaction is believed to take place between gypsum and the functional water soluble polymers that leads to a stronger and tougher joint at the seam with improved rheology and cohesive integrity of joint compound.

The invention required screening a variety of potential additives to determine their effect on the drying time and joint flexibility. Test methods were developed for quantifying the joint strength and drying rate, and a series of candidates were selected for testing. A first group of additives were selected for their capacity to improve the strength and flexibility of the joint, while a second group of additives were selected for their water absorbing characteristics to improve the drying rate. There was some overlap among the two groups with a couple of additives achieving both objectives. Table 1 lists the additives in each group.

TABLE 1

| Water Absorbers | Flexible Polymers |
| --- | --- |
| Polyethylene glycol (PEG)* | Airflex/Vinnapas Redispersible powders |
| "Super Slurper" Waterlock | Polyethylene glycol (PEG)* |

TABLE 1-continued

| Water Absorbers | Flexible Polymers |
| --- | --- |
| Sorbitol | Rohm & Haas latex |
| Starches (Corn and Potato) | Shell Epi-Rez epoxy latex* |
| Cellulose | Airflex Ethylene-Vinyl Acetate latexes |
| Microcrystalline cellulose | Polyvinyl pyrrolidone (PVP) and copolymers |
| Glass microspheres | |
| Fumed silica | Polyvinyl alcohol (PVA) |
| Glycerol (liquid) | Shell Epon solid epoxy resins* |
| Surfynol surfactants (liquid) | Polyethylenimine |
| Fluorad fluorinated surfactants (liquid) | Poly(2-ethyl oxazoline) |
| Ferrous Chloride Tetrahydrate (FeCl$_2$4H$_2$O) | Sulfonated polyester |
| | Cationic guar |
| Shell Epi-Rez epoxy latex* | Polyacrylamide |
| Magnesium stearate/stearic Acid | Polystyrene sulfonate |
| Maleic anhydride | |
| Shell Epon solid epoxy resins* | |
| Dualite polymer microspheres | |
| Incozol 2 water scavenger (liquid) | |

*indicates dual-purpose additives

Test formulations for each additive were prepared by mixing with standard United States Gypsum twenty minute ("USG-20") setting joint compound. The unmodified USG-20 compound was used as a control for comparison. The dry additives were mixed directly with the USG-20 powder before adding water. Liquid additives were mixed with the water and then combined with the dry powder. The water based latex additives were added to the powder at the same time as the water and replaced part of the total water content. The latexes replaced twenty-five percent of the standard amount of water.

A small test joint was prepared for each test formulation from two panels six inches along by one foot wide. Each joint was characterized by drying rate and flexural strength. Drying rate was determined by measuring the water content using a Delmhorst BD-2000 hand-held moisture meter on the gypsum setting. Water content was measured initially and at ten, twenty, thirty, forty, and sixty minutes, with each measurement comprising an average of three readings. Flexural strength was measured by placing the joint along the edge of a benchtop and adding weights in two hundred fifty gram increments at the end of the overhanging panel. The first appearance of a crack was determined to be the failure point.

The best results were obtained for polyvinyl pyrrolidone (PVP), which is a water-soluble polymer. PVP was selected to absorb some of the water to reduce drying time and to increase the strength of the compound by either reducing the porosity of the compound or by acting as a reinforcement. Formulations with PVP had crack resistance of at least 2250 grams, compared with 800 grams for the control, and contained an average of 0.27% water after sixty minutes compared to 2.4% water in the control after sixty minutes. Thus, the inclusion of PVP increased the flexibility of the joint and simultaneously reduced the drying time of the joint compound.

The addition of a powdered solid bisphenol-A-based epoxy resin, here Shell EPON™ 1002F, also produced good results. EPON™ Resin 1002F is a solid epoxy resin derived from bisphenol-A, manufactured by Shell Chemicals. The compound of gypsum and the epoxy resin yielded a strength of 1000 grams and an average of 0.22% water after sixty minutes. Most of the additives produced either an improvement in the strength or a reduction in the drying time, but rarely both at the same time. In fact, many of the water absorbing additives removed too much water too quickly, making it necessary to add additional water to form the joint. Additives which absorbed or removed the water more slowly were more effective.

TABLE 2

| Panel # | Additive | % water @ 60 min | First Crack (g) |
|---|---|---|---|
| Control | None | 2.4 | 800 |
| 1 | Airflex RP-230 (Air Products and Chemicals Inc./ Wacker Chemicals) | 4.77 | 250 |
| 2 | Airflex RP-551Z( Air Products) | 1.77 | 500 |
| 3 | Vinnapas LL-56000G(Air Products) | 4.7 | 750 |
| 4 | PEG 8000 (Union Carbide) | 1.6 | 500 |
| 5 | Super Slurper (Hoechst) | 6.5 | 500 |
| 6 | Sorbitol (Aldrich) | 4.03 | 500 |
| 7 | Corn starch (AE Staley) | 1.2 | 750 |
| 7R | Corn starch | 0.4 | 1000 |
| 8 | Potato starch(AE Staley) | 2.1 | 500 |
| 9 | Microcrystalline cellulose(Hercules) | 4.33 | 1250 |
| 10 | Cellulose EC-N-7NF (Hercules) | 5.7 | 250 |
| 11 | Glass microspheres, @ 1% (3M Corp) | 5.1 | 750 |
| 12 | Fumed silica (Cabot Corp) | 5.2 | 500 |
| 13 | Glycerol (Aldrich) | 4.3 | 500 |
| 14 | Surfynol 104E (Air Products) | 5.3 | 1250 |
| 15 | Fluorad FC-171 (3M) | 2.53 | 1000 |
| 16 | Fluorad FC-129(3M) | 4.63 | 750 |
| 17 | FeCl2.4H2O | 0.17 | 750 |
| 18 | Rhom/Haas acrylic latex | 3.2 | 1000 |
| 19 | Epi-Rez 5003-W-55 latex (Shell) | 0.07 | 250 |
| 20 | AirFlex 7200 latex (Air Products) | 0.1 | 500 |
| 21 | PVP K29-32( International Specialty Polymers, ISP) | 0.53 | 2500 |
| 21R | PVP K29-32 (ISP) | 0.07 | 2250 |
| 22 | PVA 523 (Air Products) | 3.2 | 1500 |
| 23 | Magnesium stearate | 4.3 | 750 |
| 24 | Stearic acid | 2.13 | 1000 |
| 25 | Airflex 300 latex (Air Products) | 3.47 | 1000 |
| 26 | Maleic anhydride | 4.63 | 750 |
| 27 | Airflex XX-230 latex (Air Products) | 1.57 | 500 |
| 28 | Epon 1002F (epoxy) (Shell) | 0 | 1000 |
| 28R | Epon 1002F (Shell) | 0.5 | 1250 |
| 29 | Dualite MS-7000, @ 1% (Pierce & Stevens) | 0.17 | 750 |
| 29R | Dualite MS-7000, @ 1% | 1.9 | 750 |
| 30 | Dualite MS-7000, @ 0.1% | 0.2 | 750 |
| 31 | Glass microspheres, @ 0.1% (3M) | 1 | 750 |
| 32 | Incozol 2 @ 1% (Industrial Copolymers Limited) | 2.33 | 1250 |
| 33 | Incozol 2 @ 5% | 0.7 | 1250 |
| 34 | PVP K90 (ISP)) | 0.2 | 1500 |
| 35 | Epon 1007F ( Shell) | 0.17 | 1000 |
| 36 | PVP K29-32 + Epon 1002 F. | 0.13 | 3000 |
| 37 | PVA 523 + Dualite | 1 | 1500 |
| 38 | Micro cellulose + Airflex7200 | 0.1 | 500 |
| 39 | Surfynol 104E + Incozol 2 | 0.23 | 750 |
| 40 | Fluorad FC171 + Corn Starch | .02 | 750 |

The best combined results came from adding both PVP and the epoxy resin to the formulation at the same time (test#36), which had a synergistic effect compared to the individual additives. The sample with both PVP and the epoxy had a strength of 3000 grams and 0.13% water at sixty minutes. This sample had more than three times the crack resistance than the control joint and was effectively dry after sixty minutes. The use of the epoxy resin reduces drying time by at least 25% compared to the drying time without the epoxy resin.

An effect of the molecular weight of polyvinyl pyrrolidone polymer on the drying time and strength properties is shown in entries 21R and 34 in Table 2. The K-29-32 polymer in entry 21R has a molecular weight of 40,000–80,000, and K-90 (entry 34) has a molecular weight of 900,000–1,500,000. K-29-32 produces significantly better performance both in faster drying and improved strength properties. Attempts to use K-120 polymer (molecular weight 2,000,000–3,000,000) were not as successful due to very high viscosity of the joint compound. Attempts to use lower molecular weight K-15 polymer (molecular weight of 6,000–15,000) were of limited effectiveness because of low viscosity.

After confirming that the laboratory results could be achieved in the factory, the additives were mixed with USG thirty minute compounds and forty-five minute compounds with similar success. The modified joint compound with both the PVP and the epoxy resin demonstrated better adhesion to the wallboard resulting in less spillage, and during transportation and installation the joints with the modified gypsum experienced significantly less damage than the conventional gypsum. In an actual application of the improved joint compound on a horizontal ceiling surface during the trial, it was found that the compound had good flow, leveling and adhesion to the surface with less than 5% of the compound breaking loose and falling to the ground. Under the same conditions, the control joint compound had much poorer flow and leveling (increased troweling necessary to obtain an acceptably smooth coating) with over 50% of the compound falling to the ground.

The next step was to evaluate the limits of the additives to determine whether an ideal range could be identified, and whether less additives could achieve the same objectives at a lower cost. The 5% by weight PVP and 5% epoxy was the starting point for the evaluation process, although a range of up to 10% was investigated with a lower limit of 0.5%. During a second phase of testing, possible substitutes were evaluated based on the success of the initial testing for improvement to crack strength. Additives were selected either because they were water soluble or dispersible, or because they were functionally similar to the PVP (nitrogen groups, particularly the amine and amide type) and/or ionic functionality like sulfonate. Some PVP blends and PVP derivatives were also included. Of the new additives, seven were found to at least double the strength of the control joint. Of these compounds, three were liquids (sulfonated polyester Eastek 1300 polymer, PVP Coplymer 937, and polyethylenimine Lupasol P) which were disfavored because of the difficulty of using a liquid with a dry powder. Of the dry powder additives, Ganex P-904L and PVP/PA S-630 copolymers worked but were disfavored because the present cost of those additive made them less attractive candidates for today's wallboards. Aquazol 5 (poly ethyl oxazoline) and Jaguar C-14S (a cationic guar) were found to have raw material costs similar to or less than PVP and work similarly well. Table 3 illustrates the crack strength results of these additives.

TABLE 3

| Additive | % Additive | Crack Strength (g) |
|---|---|---|
| Aquazol 5 (Polymer Chemistry Innovations) | 1 | 3000 |
| Aquazol 5 | 5 | 3500 |
| Eastek 1300 Eastman chemicals) | 5 | 2500 |
| Ganex P-904L (ISP) | 5 | 3500 |
| Copolymer 937 (ISP) | 1 | 2500 |
| Copolymer 937 (ISP) | 5 | 3000 |
| PVP/PA S-630 (ISP) | 5 | 2500 |

TABLE 3-continued

| Additive | % Additive | Crack Strength (g) |
|---|---|---|
| Lupasol P (BASF) | 5 | 3000 |
| Jaguar C-14S (Rhodia Inc) | 1 | 2500 |

Optimization tests were conducted to determine the lowest range of additive that would produce acceptable strength improvement. Reducing the amount of additive from 5% PVP in the earlier testing to 2.5% was found to still produce acceptable strength performance, where the optimum range was approximately between 3% and 6% with between 2% and 4% EPON™ 1002F. Aquazol 5 could be used at 1.5% and still have acceptable strength performance, and Jaguar C-14S was used at 1%. The ideal formulation as far as crack strength and drying time was an equal mixture of 3.74% PVP and EPON™ 1002F, along with 25.2% water and 67.32% USG twenty minute gypsum (by weight), which yielded a crack strength of 2167±312 grams and a water content after sixty minutes of 1.27%±0.08%.

Using the above described compound, a pair of gypsum wall units can be joined with the joint compound in a prefabricated manner and transported to the job site, or fabricated on the job site with very good results. The compound provides a more flexible joint allowing transportation with reduced cracking in the joints, and reduces costs by reducing the drying time of the joint. The use of water absorbers with flexible polymers improve the performance of gypum-based wall joint compounds. While economical concerns currently suggest certain choices over others, the invention is intended to comprise a scope beyond current fiscal concerns to cover the improvements in the wallboard joint compounds. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved wall joint compound including water and gypsum, the improvement comprising a water-soluble functional cationic polymer containing nitrogen.

2. The improved wall joint compound of claim 1 wherein the functional cationic polymer comprises polyvinyl pyrrolidone.

3. The improved wall joint compound of claim 2 wherein the functional cationic polymer comprises polyvinyl pyrrolidone between two and six percent of the total weight of the joint compound.

4. The improved wall joint compound of claim 1 wherein the functional cationic polymer comprises a copolymer of vinyl pyrrolidone.

5. The improved wall joint compound of claim 1 wherein the functional cationic polymer comprises polyvinyl amine.

6. The improved wall joint compound of claim 1 wherein the functional cationic polymer comprises a cationic polysaccharide.

7. The improved wall joint compound of claim 1 further comprising a water-soluble functional polymer containing a sulfonate group.

8. The improved wall joint compound of claim 7 wherein the functional polymer containing a sulfonate group comprises acryl amido propane sulfonate.

9. The improved wall joint compound of claim 7 wherein the functional polymer containing a sulfonate group comprises polystyrene sulfonate.

10. The improved wall joint compound of claim 7 wherein the functional polymer containing a sulfonate group comprises polyvinyl sulfonate.

11. The improved wall joint compound of claim 1 further comprising an epoxy resin.

12. The improved wall joint compound of claim 11 wherein the epoxy resin comprises between two and four percent by weight of said joint compound.

13. The improved wall joint compound of claim 7 further comprising an epoxy resin.

14. The improved wall joint compound of claim 13 wherein the epoxy resin comprises between two and four percent by weight of said joint compound.

15. An improved wall joint compound including water and gypsum, the improvement comprising a water-soluble functional polymer containing a sulfonate group.

16. The improved wall joint compound of claim 15 wherein the functional polymer containing a sulfonate group comprises acryl amido propane sulfonate.

17. The improved wall joint compound of claim 15 wherein the functional polymer containing a sulfonate group comprises polystyrene sulfonate.

18. The improved wall joint compound of claim 15 wherein the functional polymer containing a sulfonate group comprises polyvinyl sulfonate.

19. The improved wall joint compound of claim 15 further comprising an epoxy resin.

20. The improved wall joint compound of claim 19 wherein the epoxy resin comprises between two and four percent by weight of said joint compound.

21. A prefabricated wall comprising:
a pair of individual wall units joined at a respective edge;
a joint compound for joining the respective edges, said joint compound comprising:
water;
an inorganic joint compound filler; and
at least one water-soluble functional polymer selected from cationic functional polymers containing nitrogen and functional polymers containing a sulfonate group.

22. The prefabricated wall of claim 21 wherein said joint compound further comprises an epoxy resin.

23. The prefabricated wall of claim 22 wherein the epoxy resin comprises solid bisphenol-A.

24. The prefabricated wall of claim 22 wherein the epoxy resin is selected to reduce the drying time of the joint compound by twenty-five percent.

* * * * *